United States Patent [19]
Allen

[11] Patent Number: 5,871,305
[45] Date of Patent: Feb. 16, 1999

[54] ACTIVE COOLING SYSTEM BOOM

[76] Inventor: Alan A. Allen, 19220 NE. 143rd Pl., Woodinville, Wash. 98072

[21] Appl. No.: 901,577

[22] Filed: Jul. 28, 1997

[51] Int. Cl.[6] .................................................. E02B 15/04
[52] U.S. Cl. ............................................. 405/70; 405/63
[58] Field of Search ....................... 405/63, 70; 210/241, 210/242.1, 242.2, 242.3; 441/66, 30

[56] References Cited

U.S. PATENT DOCUMENTS

| | | | |
|---|---|---|---|
| 4,537,528 | 8/1985 | Simpson | 405/72 |
| 4,605,586 | 8/1986 | Lane | 442/79 |
| 4,619,553 | 10/1986 | Fischer | 405/63 |
| 4,645,376 | 2/1987 | Simpson | 405/63 |
| 4,752,393 | 6/1988 | Meyers | 210/242.3 |
| 4,781,493 | 11/1988 | Fischer | 405/63 |
| 4,923,332 | 5/1990 | Sanocki et al. | 405/63 |
| 5,374,133 | 12/1994 | Lazes et al. | 405/68 |
| 5,480,261 | 1/1996 | Meyers et al. | 405/63 |
| 5,547,313 | 8/1996 | Holland | 405/63 |

Primary Examiner—Tamara L. Graysay
Assistant Examiner—Tara L. Mayo
Attorney, Agent, or Firm—Zackery Legal Group

[57] ABSTRACT

Provided in accordance with the present invention, is a preferred embodiment of a boom for use in or containing, concentrating, and burning oil on the surface of a body of water. The boom includes a series of flotation sections, having an average density substantially less than that of water for providing flotation. The boom also includes a water distribution system at least partially surrounding one or more flotation sections. The water distribution system includes material substantially permeable to the water, for receiving, absorbing, and distribution of the water for heat protection. The boom additionally includes a pressurized fluid system/structure for placing the water distribution system in fluid communication with a supply of pressurized water. The pressurized fluid system includes at least one fluid conduit, extending for substantially the length of the boom. The conduit includes an end adapted for connecting to an external source of pressurized water. In operation, the conduit delivers the water along the boom's length, to the water distribution system.

20 Claims, 9 Drawing Sheets

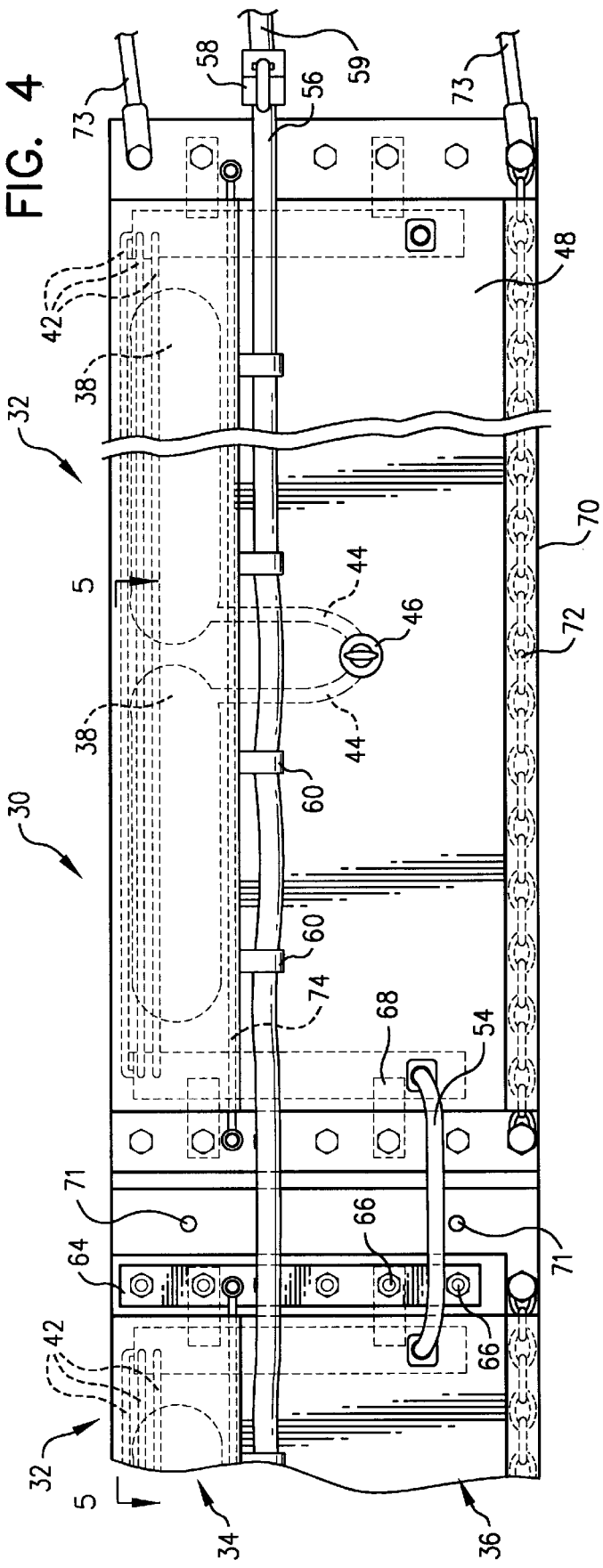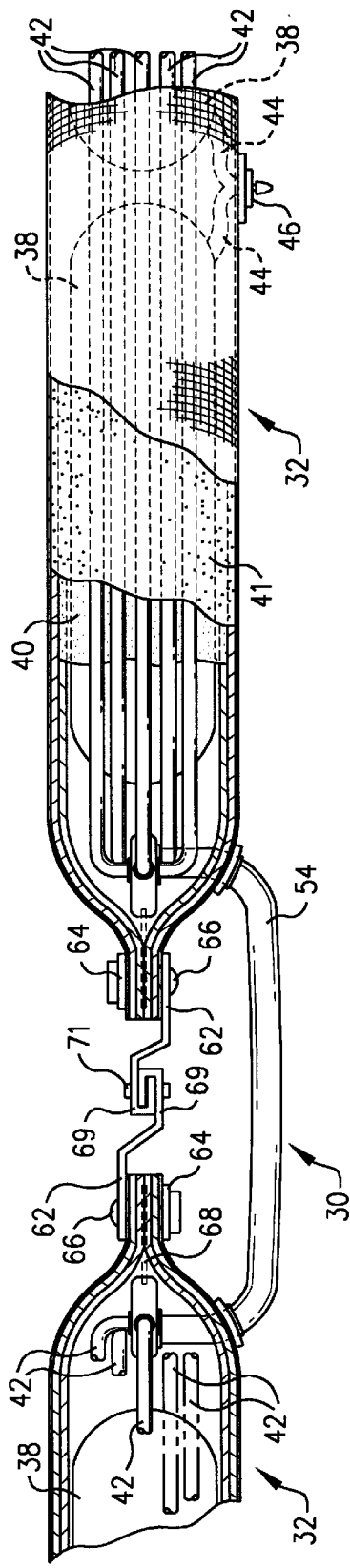

5,871,305

ACTIVE COOLING SYSTEM BOOM

FIELD OF THE INVENTION

The present invention relates generally to oil spill containment booms for flotation on a body of water, and in particular, to fire-resistant booms for the containment and controlled combustion of oil and other pollutants on the water's surface.

BACKGROUND OF THE INVENTION

Oil spills pose a major environmental threat to our increasingly urbanized world. Contamination of water and shoreline areas by even relatively modest amounts of oil can result in disastrous environmental consequences. In the environment, oil dissipates slowly over time and can cause significant adverse impacts for years unless cleaned up.

In response to an oil spill, clean-up personnel generally focus on cleaning up the spilled oil before the oil drifts ashore. Cleaning up an oil spill at sea dramatically reduces the risk of the spill impacting human population centers and other natural resources generally found in nearshore/shoreline environments. The adverse impact of an oil spill can thus often be significantly alleviated if the oil can be cleaned up before it reaches shoreline areas.

Cleaning up an oil slick floating on the surface of a body of water poses difficult problems. One attempted solution has been the use of ship-mounted oil containment and recovery systems (i.e., conventional booms and skimmers). Such recovery systems attempt to remove oil from the water's surface using direct suction devices, hydrodynamic planes, and a variety of oleophilic (oil-attracting) surfaces.

While satisfactory for some applications, such mechanical recovery systems generally require a great deal of logistical support, have relatively low oil recovery rates, and often pick up substantial volumes of water as well. The physical recovery of spilled oil with such skimming devices requires the use of large storage containers for the recovered oil and water, oil/water separation systems, and the provision of oil and oily waste disposal systems for the recovered fluids.

Many oil spill situations cannot be controlled adequately or in a timely manner with mechanical skimmers alone. The controlled burning of spilled oil in place (i.e., in-situ) with a fire-resistant boom provides an effective means of eliminating large volumes of oil quickly, with minimal logistical support, and without the need for large oil/water storage systems.

FIG. 1 illustrates spilled oil 20 floating on the surface of a body of water, being contained with a fire-resistant floating boom structure 22. Personnel maneuver the boom 22 into a shape corresponding generally to the letter "U", and contain and concentrate the spilled oil 20 (and/or other pollutants) between the legs of the U-shaped configuration. Once the oil has been sufficiently concentrated in the apex of the boom, personnel may ignite the oil using any of a number of aerial or surface ignition systems. The burning substantially consumes the oil, typically 90% to 98% of the contained oil, minimizing the risk of environmental damage. Unfortunately, the heat from the burning oil creates enormous thermal stress on the containment boom (typically 1800° to 2000° F.) which under wind and wave conditions may cause the rapid deterioration of even high temperature-resistant materials used in forming such booms.

Referring to FIG. 2, an oil containment boom 22 usually includes two main components: (i) a buoyant portion 24 extending above the water's surface 25 for flotation and to keep oil from splashing over the boom; and (2) a skirt or ballast portion 26 extending below the water's surface to prevent oil from escaping beneath the boom. Heat from the burning oil will typically impact the buoyant portion, and not the skirt/ballast portion as the skirt and ballast components generally remain submerged below the water's surface.

With continued reference to FIG. 2, one attempted solution for protecting fire-resistant containment booms from heat damage involves a cooling layer 28 in or between portions of the buoyant portion 24. The cooling layer is formed from a water absorbent material, in contact with the water. The cooling layer absorbs water, drawing moisture around the buoyant portion, against the influence of gravity, due to wicking. This moisture then functions for protecting the boom from heat.

While perhaps satisfactory in some applications, such passive cooling due to wicking generally provides insufficient heat protection. In particular, such passive cooling does not draw enough moisture, and/or does not draw the moisture upward far enough against gravity, along the buoyant portion to provide sufficient heat protection. That is, heat from burning oil still significantly damages such booms, even when the booms are made of high-temperature resistant materials. After use in an oil-burning operation, such booms normally require replacement and/or substantial repair.

The present invention provides an improved solution.

SUMMARY OF THE INVENTION

Provided in accordance with the present invention, are preferred embodiments of booms for deployment on the surface of a body of water. The booms each include features suiting them for use in containing spilled oil and/or other pollutants floating on the water's surface. In particular, the booms include active cooling systems for heat protection when using the booms for the burning of contained oil on the water's surface.

The booms all include at least one flotation section. The flotation section has an average density substantially less than that of water for providing flotation for the boom. For achieving the requisite average density, the flotation sections preferably employ foam, and/or an inflatable chamber. Preferably, the booms employ a series of flotation sections, extending along the boom's length.

The booms additionally include a system for receiving and distributing a fluid, preferably water, around the boom for cooling and protection of the boom from heat. The distribution system preferably includes at least one fluid conduit, extending for at least a portion of the boom's length. The conduit connects to an external source of pressurized water, for instance, a pump onboard a boom-towing vessel, and delivers the water along the boom. Preferably, the water is pumped directly from the surrounding fresh or salt-water environment.

In a preferred embodiment, the distribution system includes a substantially hydrophilic material for receiving the pressurized water. The material at least partially surrounds one or more flotation sections in a boom, and absorbs and further aids in distributing the water. In another preferred embodiment, the water distribution system includes a space surrounding a flotation section, wherein water accumulates in this space for providing heat protection.

In other features, the booms include a bottom-tensioned ballast member, preferably a chain. The ballast member provides strength for the boom, and functions in maintaining the boom in proper orientation when deployed on the water's surface.

The present invention thus provides for the containment of burning oil with fire-resistant booms having a pressurized, active water-cooling system for heat protection of above-water components.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4 illustrates a side view of the boom of FIG. 3;

FIG. 5 illustrates a partial, top, cross-sectional view of the boom of FIG. 4, taken along section line 5—5 in FIG. 4;

DETAILED DESCRIPTION OF THE PREFERRED EMBODIMENTS

Figure 1:
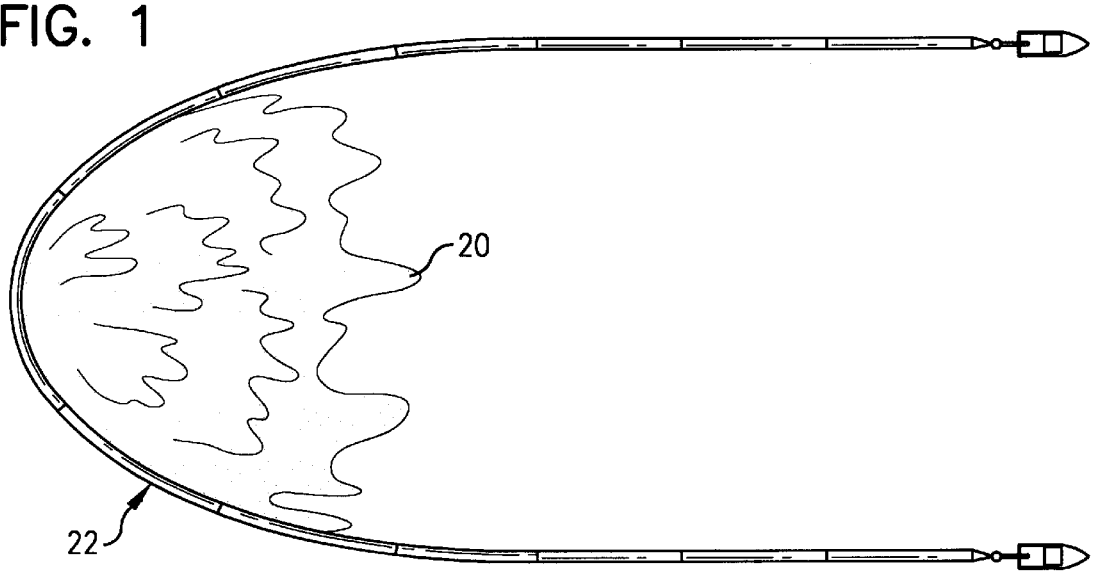
FIG. 1 schematically illustrates vessels deploying a boom into a U-configuration for the containment of oil and/or other pollutants floating on the surface of a body of water.
Figure 2:
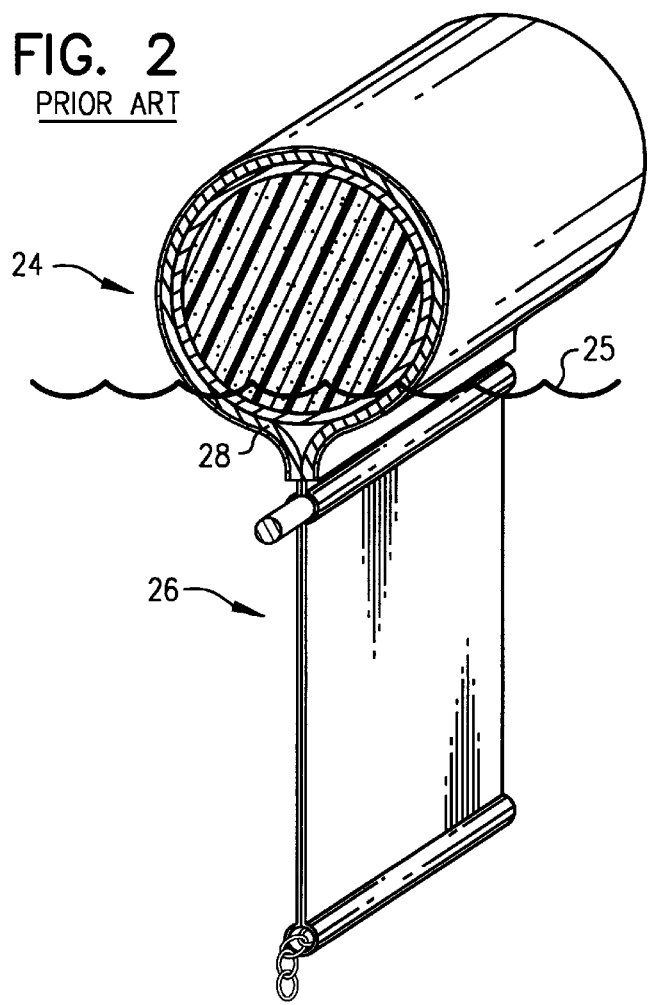
FIG. 2 illustrates a perspective view of a portion of an oil containment boom having a passive cooling system for heat protection, with part of the boom shown in cross-section.
Figure 3:
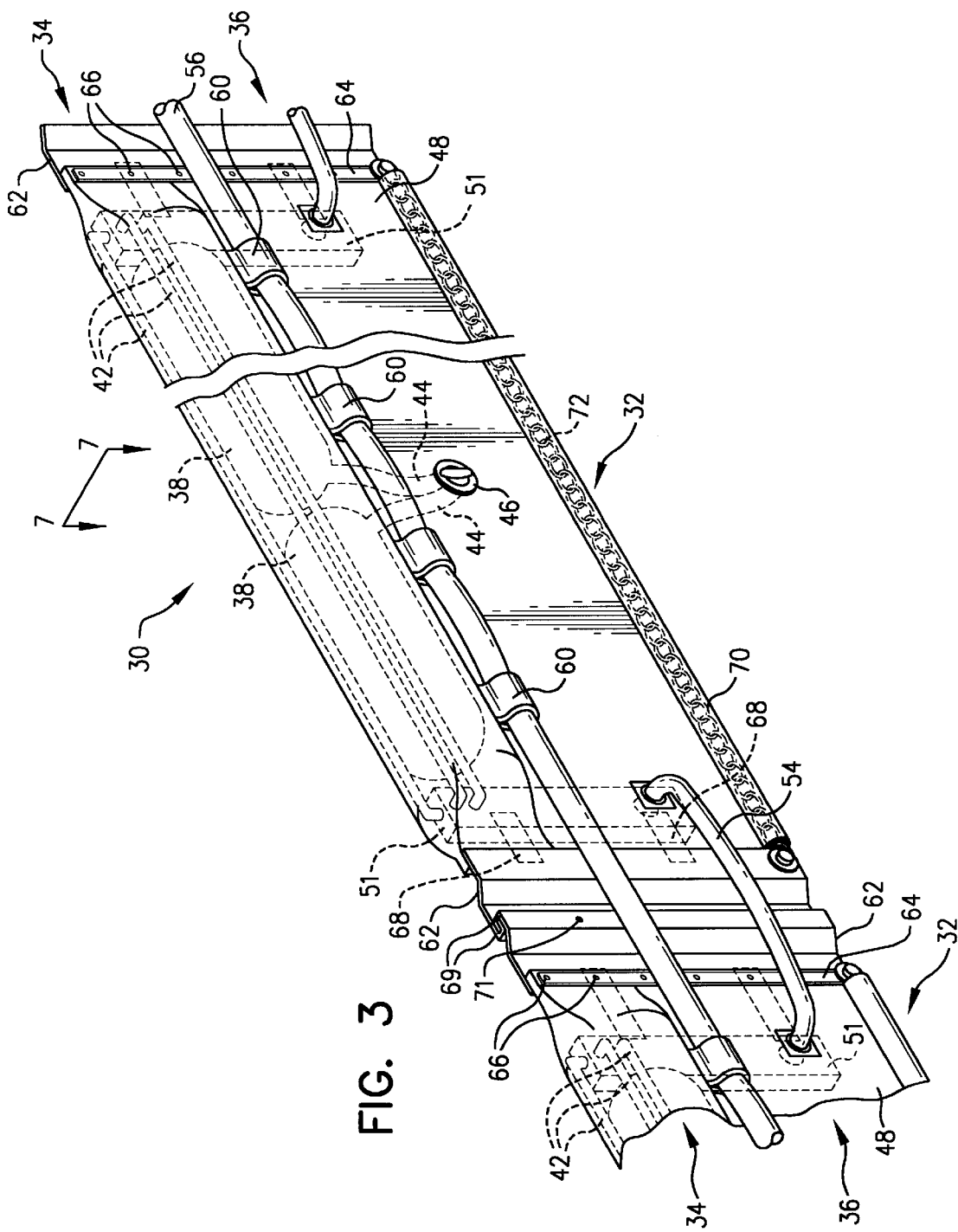
FIG. 3 illustrates a perspective view of a portion of a preferred embodiment of a boom in accordance with the present invention.

FIG. 3 illustrates a perspective view of a portion of a preferred embodiment of a boom 30 in accordance with the present invention. The boom 30 includes features suiting it for use in containing spilled oil and/or other pollutants floating on the surface of a body of water. In particular, the boom 30 includes an active cooling system for heat protection when using the boom for containing, concentrating, and burning oil on the water's surface.

The boom 30 preferably includes shorter boom sections 32, that connect in an end-to-end arrangement for forming the boom (FIG. 3 illustrates end portions of booms sections 32). Thus, if one section 32 becomes damaged, that section can be replaced without requiring replacement of the entire boom. Preferably, the boom sections 32 have lengths in the range from 25 to 150 feet, and most preferably have a length of about 100 feet.

Each boom section 32 includes a buoyant portion 34, and a skirt or ballast portion 36. When the boom 30 deploys on a body of water, the buoyant portion 34 provides flotation, and substantially floats on the water's surface for preventing oil and/or other pollutants from escaping over the boom. The ballast portion 36 extends generally straight down underneath the water's surface, below the buoyant portion 34, for substantially preventing oil from escaping underneath the boom 30.

FIG. 5 illustrates a partial cross-sectional top view of the boom 30. Referring to FIG. 5, the principal components of the buoyant portion 34 include: (i) a series of flotation sections 38 for providing flotation; (ii) a water distribution system in the form of cooling layers 40 and 41 at least partially surrounding each flotation section, for distributing water; and (iii) a pressurized water supply system for connecting the water distribution system to a pressurized supply of water, i.e., at least one fluid conduit 42 for actively supplying water to the cooling layers 40 and 41.

Each flotation section 38 is formed from an air-filled bladder or chamber, forming a segment along the length of the boom section 32. Each segment or chamber preferably has a length from four to six feet, and most preferably has a length of around five feet. The chambers are formed from a sheet of conventional fabric, composed substantially of a polyvinyl chloride (PVC) or a polyurethane material. Preferably the material has a fabric weight in the range of approximately 15 to 30 ounces per square yard, and most preferably, a weight of about 22 ounces per square yard. To form each chamber, the fabric is folded over and heat-sealed together at selected locations.

Preferably, a single sheet of fabric extends for substantially the length of each boom section 32. This sheet forms all of the flotation sections 38 for that particular boom section 32, with air chambers extending along the length of the boom section in a substantially, end-to-end arrangement. A short space separates the end of one air chamber from the next. This spacing enhances flexibility. In response to a passing wave, the boom section 32 can thus flex at the spaces, and undulate with the water's surface. That is, the enhanced flexibility due to spacing between flotation chambers permits the boom section 32 to better "ride over" passing waves.

The fabric defining the flotation chambers additionally defines an air channel 44 for each flotation section 38, for inflating that flotation section chamber with air. The air channels 44 are formed by selectively heat sealing areas of the fabric to define a path of air communication to each flotation section chamber.

As illustrated, the air channels 44 are preferably formed in pairs. Each air channel 44 of a pair, extends from a conventional air valve 46. Each air valve 46 mounts between a pair of flotation sections 38. One channel 44 connects the air valve 46 to one flotation section 38, and the other channel connects to the other section. The valve 46 preferably has different positions for inflating one flotation section 38 or the other; deflating the flotation sections; and/or for sealing the channels 44 for maintaining inflation pressure in the flotation sections. Preferably, the flotation sections 38 are inflated up to about 1 to 3 psi above atmospheric pressure, and most preferably, they are inflated to between 1 and 2 psi above atmospheric pressure.

Referring to FIG. 3, the valves 46 preferably mount to the ballast portion 36 of each boom section 32. In particular, the fabric forming the flotation sections 38, extends downward to form supporting structure for the ballast portion 36. More particularly, the fabric extends to the bottom edge of the boom section 32, and forms a depending skirt 48. The valves 46 for inflating the flotation sections 38, preferably mount to the skirt 48, below the water line. In this way, the valves 46 are generally immersed in water for protection from heat.

Returning to FIG. 5, cooling layers 40 and 41 at least partially surround each flotation section 38. Preferably, the cooling layers 40 and 41 are each formed from sheets of fabric. Each sheet extends for substantially the length of the boom section 32. These sheets are formed from a hydrophilic, water absorbing, heat resistant material. The material absorbs water for protecting the boom section 32 from heat. The fabric is preferably a conventional felt material, such as the fabric sold under the trade name NOMEX, manufactured by the duPont Company of Wilmington, Del. Preferably, each sheet is about ⅛ to ½ inch in thickness, and most preferably has a thickness of about ¼ inch.

Figure 7:
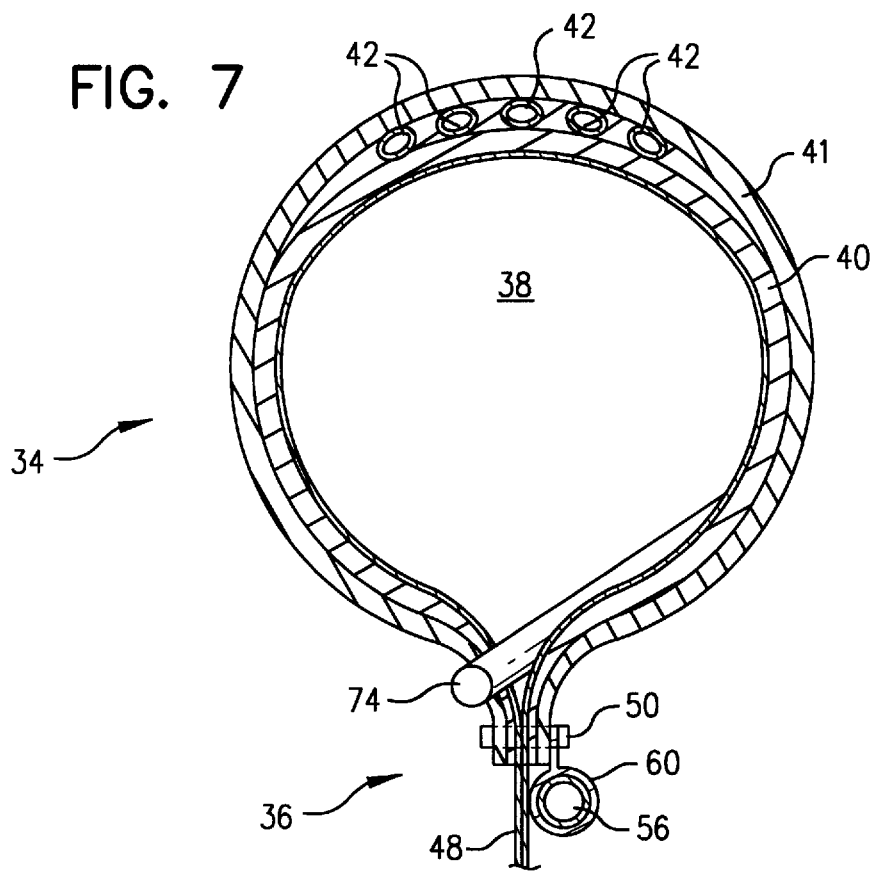
FIG. 7 illustrates a partial cross sectional view of the boom of FIG. 3, taken along section line 7—7 of FIG. 3.

FIG. 7 illustrates a cross-sectional view of the buoyant portion 34 of a boom section 32, and the upper part of the ballast portion 36. Referring to FIG. 7, the cooling layers 40 and 41 fasten around the sheet forming the flotation sections 38 in an arrangement similar to a French cuff. Specifically, each cooling layer sheet arcs outward, such that the inner surface of each sheet edge faces the skirt 48, that extends from the bottom of the buoyant portion 34. Conventional fastening devices 50, such as rivets, bolts, staples, and/or etc. penetrate through the cooling layer sheet edges and the skirt 48 at intervals along the length of the boom section 32. The fastening devices 50 maintain the cooling layers 40 and 41 in position, surrounding the flotation sections 38.

Fluid conduits 42 extend for substantially the length of each boom section 32. In particular, the fluid conduits 42 extend between the cooling layers 40 and 41 for actively supplying the layers with cooling fluid, preferably water. That is, the conduits 42 function for providing the cooling layers 40 and 41 with a pressurized source of water.

The conduits 42 are preferably manufactured to "weep" fluid into the cooling layers, as with conventional garden hoses used for such weep-type irrigation. This type of hose is fluid permeable, so that water flowing through the hose, "weeps" through the hose walls to the environment. This type of garden hose, for example, is manufactured by the Aquapore Company of Phoenix, Ariz.

Unlike such commercially available garden hoses, though, the conduits 42 are preferably formed from a conventional material, resistant to elevated temperatures. For instance, the conduits 42 may be formed from the material typically employed in hoses for fire fighting. For maintaining proper spacing in the boom section 32, the conduits 42 are preferably sewn to at least one of the cooling layers 40 or 41. Alternatively, the conduits 42 may extend through channels formed by selectively sewing of areas of the cooling layers 40 and 41 to one another. The conduits 42 may also be woven into a net extending between the cooling layers 40 and 41, or embedded into a third layer, for maintaining their positions.

The conduits 42 generally extend along the boom section 32, to the side of the flotation sections 38, opposite the ballast portion 36. When a boom section 32 deploys, the conduits 42 are thus located above the flotation sections 38. Under the influence of gravity, fluid from the conduits 42 therefore tends to travel downward through the cooling layers 40 and 41, around the flotation sections 38.

The conduits 42 extend along the length of the boom section 32 in a generally spaced apart, side-by-side arrangement. In particular, the conduits 42 are circumferentially spaced at approximately regular intervals, above the top portion of the flotation sections 38. The spacing centers around the top of the flotation sections 38, extending for about one-quarter of the distance around the periphery of the flotation sections. The spacing promotes more even distribution of fluid to the cooling layers 40 and 41, around the sides of the flotation sections 38.

Referring to FIG. 3, the conduits 42 originate in a rigid or flexible junction box 51 proximate one end of the boom section 32, and terminate at a junction box 51 proximate the other end of the boom section. The junction boxes 51 connect the conduits 42 to a pressurized supply of fluid, water, for distributing the water to the cooling layers 40 and 41.

The junction boxes 51 are elongated hollow structures, having orifices to which the conduits 42 connect. The cooling layers 40 and 41 surround the upper portion of each junction box 51. The bottom of each junction box 51, however, extends through the cooling layers 40 and 41, downward along the ballast portion 36. In this regard, the bottom of each box 51 preferably extends below the water's surface, when the boom section 32 is deployed.

Figure 6:
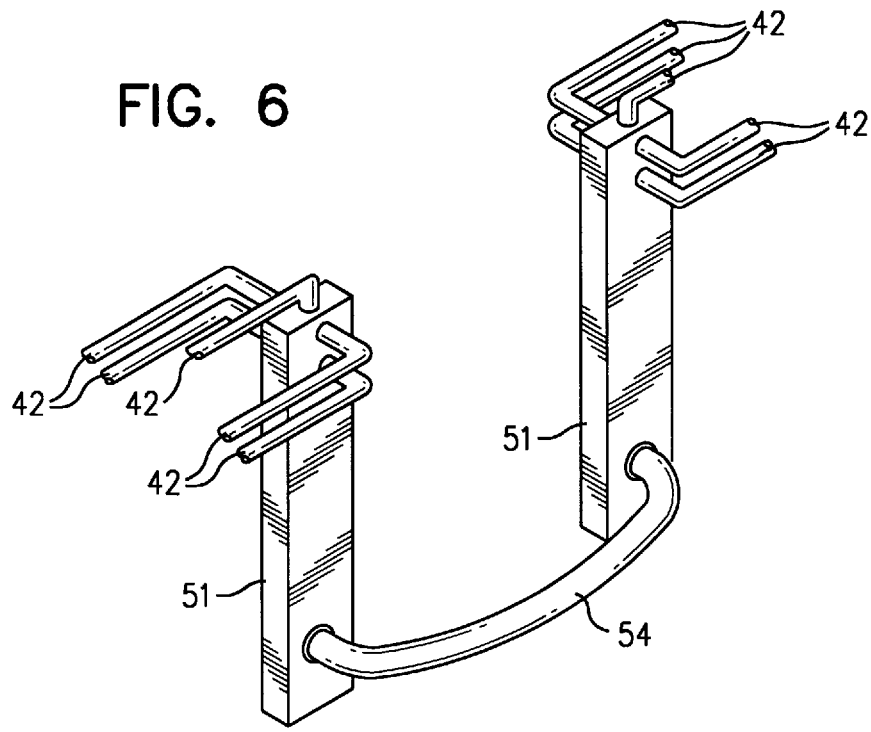
FIG. 6 illustrates fluid junction boxes from the boom of FIG. 3.

The bottom of each junction box 51 includes an orifice to which a flexible jumper conduit 54 connects. The jumper conduit 54 connects one junction box 51 to another, from one boom section 32 to another. The jumper conduits 54 thus provide for a supply of water to the conduits 42 of each boom section 32, along the boom's length via the junction boxes 51. FIG. 6 illustrates a pair of junction boxes 51, shown removed from their respective boom sections 32, connected together via a jumper conduit 54.

FIG. 4 illustrates a side view of the boom 30. Referring to FIG. 4, a flexible feed conduit 56 connects the junction boxes 51 to an external supply of pressurized water. Specifically, one end of the feed conduit 56 includes a conventional connector 58. The connector 58 connects the feed conduit 56 to an external source 59 of pressurized water. The other end of the feed conduit 56 connects to the bottom of a junction box 51. Water from the feed conduit 56 enters this junction box 51, and is distributed along the cooling layers 40 and 41 of each boom section 32 making up the boom 30. That is, water flows from one boom section 32 to another, via the jumper conduits 54 that connect the junction box 51 of one boom section 32, to the junction box of an adjacent boom section. Fluid conduits 42 in the cooling layers 40 and 41 receive water from the junction boxes 51, and distribute the water through the cooling layers.

Preferably, the feed conduit 56 connects to a junction box 51 proximate the apex of the boom 30. More particularly, the feed conduit 56 connects to a junction box 51 nearest the midpoint of the boom 30. Thus, the water pressure from the conduits 42 in the cooling layers 40 and 41 will be the greatest around the boom's apex, where heat protection is generally the most critical. Ideally, one feed conduit 56, extends to proximate the boom's apex, from each end of the boom 30, and connects to the junction box 51 nearest the boom's midpoint. This provides a redundant system in the event of a feed conduit 56 becoming unable to deliver water for one reason or another.

The feed conduits 56 preferably extend along the boom 30, along the ballast portion 36. Hence, the feed conduits 56 will generally be immersed in water for protection from heat. Straps 60 tie the feed conduits 56 to the skirt 48, along the length of the boom 30. Conventional connectors (not shown) may be employed for connecting feed conduit sections from one boom section 32, to another, rather than employing a single, longer feed conduit 56.

With reference to FIG. 3, each end of the boom section 32, terminates in a connector plate 62. The connector plate 62 runs from the bottom, to the top of each end of a boom section 32. The fabric forming the flotation sections 38 and the cooling layers 40 and 41, folds over, and fastens to the side of each connector plate 62. A clamping bar or plate 64 clamps the fabric layers to the connector plate 62. Specifically, conventional fastening devices 66, such as bolts, rivets, staples, and/or etc. penetrate through the clamping plate 64, the fabric layers, and the connector plate 62, to fasten these items to one another.

The connector plates 62 provide support for the junction boxes 51. In particular, brackets 68 extend from each connector plate 62 for supporting its respective junction box 51.

Referring to FIG. 5, the distal end of each connector plate 62 forms a channel 69 extending from the top to bottom of the plate. The channels 69 slidably interlock with one another for connecting one boom section 32 to another. When the channels 69 have interlocked, one or more conventional pins or other fastening devices 71 removably penetrate through the channels for helping to ensure they remain interlocked. For maneuvering the boom 30 for capturing and concentrating pollutants, a harness 73, partially shown in FIG. 4, connects to a connector plate 62 at each end of the boom, from a towing vessel. The feed conduit 56 connects to an external source of pressurized water 73, such as from a pump or tank, at the harness 73. Optionally, the feed conduit 56 may extend along the harness 73, and onto the towing vehicle, to connect to the external source of pressurized water.

With reference to FIGS. 3 and 4, the fabric forming the flotation sections 38, extends downward to form a skirt 48. The skirt 48 provides support for the ballast portion 36. Specifically, the bottom edge of the skirt 48 includes a channel or pocket 70 extending for substantially the length of the boom section 32. The pocket 70 holds a ballast/tension member 72.

The ballast/tension member 72 is a conventional metal chain. The ballast/tension member 72 slidably extends through the pocket 70, and fastens to the connector plates 62 at either end of a boom section 32. The tension member 72 functions for permitting greater tension to be applied along the length of a boom section 32. Since the tension member 72 is a metal chain, having a density substantially greater than that of water, the tension member 72 also functions to weight or ballast the lower end of the ballast portion 36.

Additionally, each boom section 32 preferably includes an upper tension member 74 as best seen in FIG. 7. The upper tension member 74 slidably extends along the bottom of the flotation sections 38, between the cooling layers 40 and 41. The upper tension member is preferably a wire cable, or a cord or rope formed of conventional high strength fibers sold under the trade name KEVLAR. The upper tension member 74 permits additional tension to be applied along the length of each boom section 32. As shown in FIG. 4, the ends of the upper tension member 74 fastens to the connector plate 62 at each end of a boom section 32.

Figure 8:
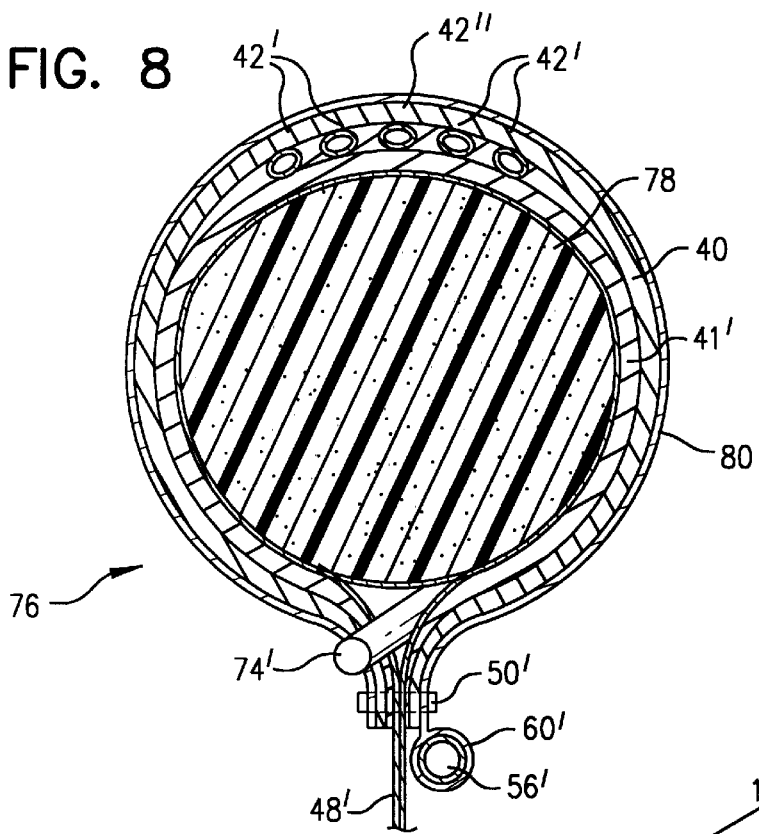
FIG. 8 illustrates a partial cross-sectional view of another preferred embodiment of a boom in accordance with the present invention.

Booms in accordance with the present invention may include flotation sections that do not require inflation. For instance, FIG. 8 illustrates another preferred embodiment of a boom 76 in accordance with the present invention, having foam core flotation sections 78. In particular, this core is preferably formed of a conventional polypropylene foam of small porosity, i.e., a micro-foam. These flotation sections 38 have an average density substantially less than that of water, and function for providing flotation.

As with the boom 30 of the previously described embodiment, the boom 76 preferably has a series of flotation sections 78 along its length, forming segments, for enhancing flexibility. That is, there is a short space between flotation section segments for better permitting the boom 76 to undulate with the water's surface when deployed, for "riding" over passing waves.

In most other respects also, the boom 76 is substantially identical to the boom 30 for the previously described embodiment. The only other principal difference, is that the boom 76 employs an optional, outer protective skin 80.

Since, in many respects, the boom 76 is substantially identical to the boom 30 for the previously described embodiment, identical reference numerals between the two embodiments are used for indicating substantially identical corresponding components. A prime symbol ('), however, follows such identical reference numerals for the embodiment presently under discussion.

In this regard, the boom 76 employs cooling layers 40' and 41', substantially identical to the cooling layers 40 and 41 for the previously described embodiment. Generally, the cooling layers 40' and 41' should provide sufficient protection. However, an outer protective skin 80 may be employed for additional durability. Specifically, the outer protective skin 80 provides additional protection against mechanical damage (i.e., abrasions, punctures, cuts, and etc.), and heat. Preferably, the outer skin 80 is formed from a conventional, high temperature resistance fabric. Fabrics of this type may include fiberglass materials, coated with silica, alumuina and/or other ceramic compounds that are resistant to elevated temperatures. For even greater durability, the outer skin 80 may include a coating resistant to ultraviolet light.

The outer skin 80 is preferably formed of a single sheet, wrapped around the cooling layers 40' and 41'. The fastening devices 50', used to fasten the cooling layers 40' and 41' around the flotation section 78, also maintain the outer skin 80 fastened around the cooling layers.

The foam core flotation sections 78 advantageously simplify the boom 76 relative to the boom 30 for the previously described embodiment. Specifically, these foam core flotation sections 78 do not require inflation, and thus do not have components for permitting inflation such as valves and air channels. The drawback, though, is that the flotation sections 78 therefore also do not deflate, such that the boom 76 requires more space when stowed between deployments.

The remainder of the components of the boom 76 are substantially identical to corresponding components in the boom 30 for the previously described embodiment. To avoid redundancy, a description of these components is accordingly not repeated. For this reason also, FIG. 8 illustrates primarily only the buoyant portion for the boom 76.

Figure 9:
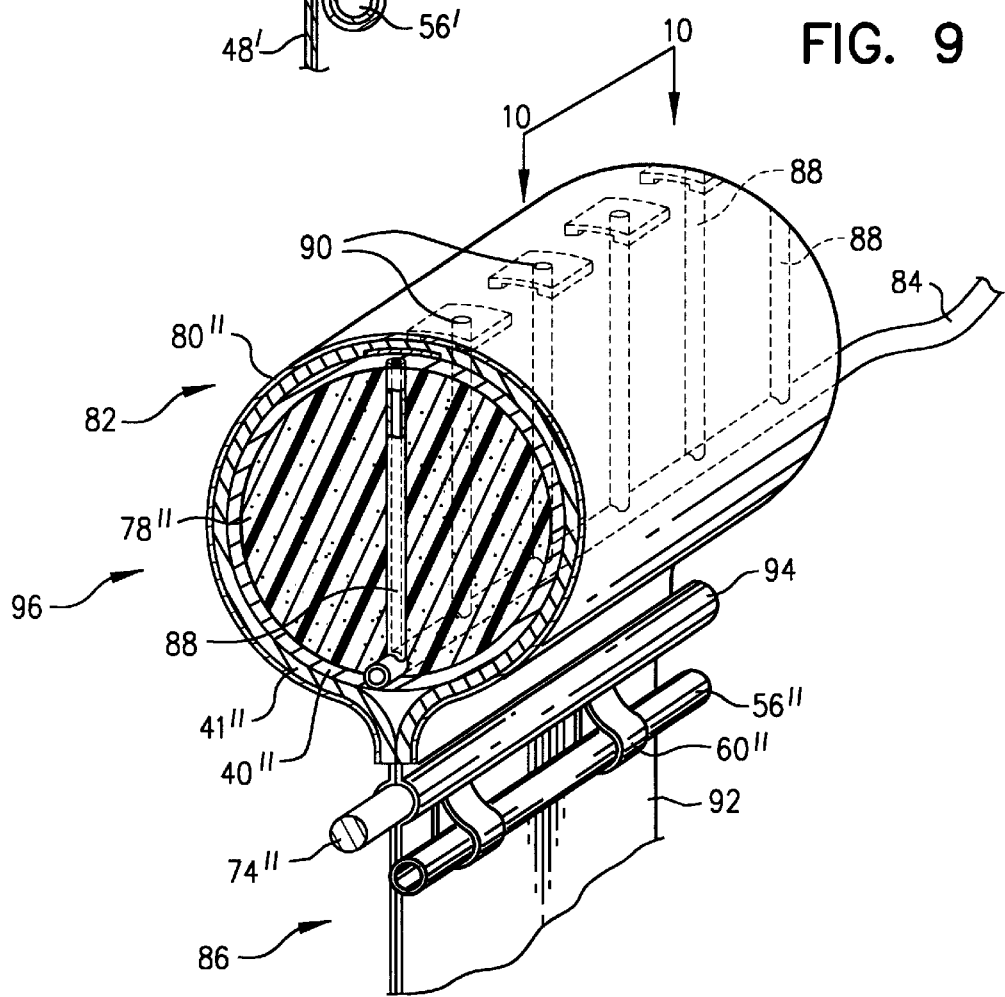
FIG. 9 illustrates a partial cross-sectional view of another preferred embodiment of a boom in accordance with the present invention.

Booms in accordance with the present invention may employ other conduit systems for actively providing fluid to cooling layers. For instance, FIG. 9 illustrates another preferred embodiment of a boom 82 in accordance with the present invention, having an alternative conduit arrangement.

The boom 82 employs several components substantially identical to those for the previously described embodiments. Identical reference numerals are used for the boom 82, and the previously described embodiments, to indicate substantially identical, corresponding components, with the double prime symbol (") following reference numerals for the embodiment presently under discussion.

In this regard, the boom 82 employs foam core flotation sections 78" substantially identical to those in the boom 76 for the previously described embodiment. However, the boom 82 includes a fluid conduit 84 that extends through the flotation sections 78".

The conduit 84 extends through the foam core, proximate the side of the core nearest the boom's ballast portion 86. The conduit 84 includes risers 88 extending upward from the main body of the conduit at periodic intervals along the conduit's length. Each risers 88 terminates at a location between the cooling layers 40" and 41". These cooling layers 40" and 41" are substantially identical to those in the boom 76 of the just previously described embodiment. (The boom 82 also includes an outer protective skin 80" substantially identical to the protective skin for the boom 76 of the just previously described embodiment).

Figure 10:
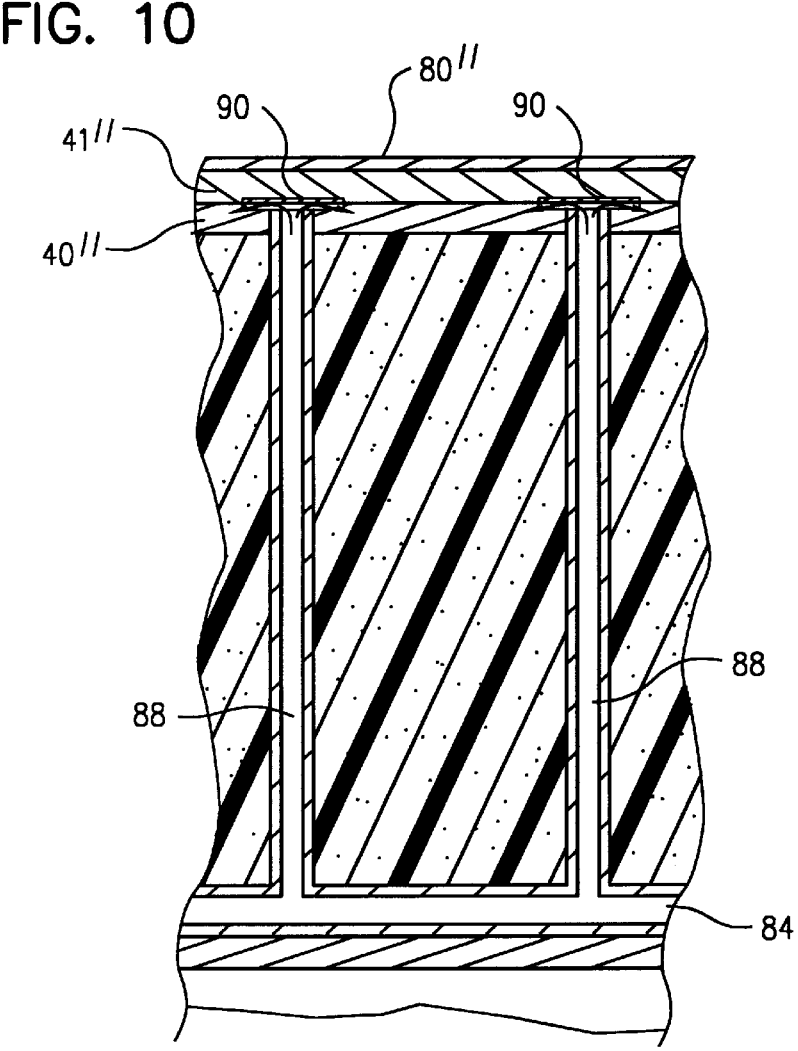
FIG. 10 illustrates a partial side cross-sectional view of part of the boom of FIG. 8, taken along section line 10—10 of FIG. 9.

A dispersion cap 90 connects to the top of each riser 88. Each cap 90 directs fluid from its respective riser 88, outward into the cooling layers 40" and 41", for greater dispersal of fluid. The caps 90 correspond generally in shape to arcuate, rectangular segments. Referring to FIG. 10, the caps 90 include an internal channel for dispersing fluid into the cooling layers 40" and 41".

The conduit 84 connects to junction boxes (not shown) as in the previously described embodiments for receiving and/or providing water from one boom section to another. The junction boxes are substantially identical to those previously described, with the exception they have less orifices. In this regard, the boom 82 is simplified in that it has a single conduit 84 passing through the buoyant portion, rather than the complexity of multiple conduits as in previously described embodiments. Thus, the junction boxes do not require as many orifices.

The conduit 84, risers 88, and dispersion caps 90 for the boom 82 are preferably formed of a conventional, heat-resistant, material. These items, however, are not manufactured to be fluid permeable, that is there is no "weeping" of water as in the conduits 42 and 42' of the previously described embodiments.

The ballast portion 86 for the boom 82 includes a modification relative to the boom 76 for the previously described embodiment. More particularly, the ballast portion 86 includes a skirt 92 extending downward from the buoyant portion 96 for the boom 82. This skirt 92 is in many respects substantially the same as the skirts 48 and 48' of the previously described embodiments, and is in fact formed of the same material these skirts. Additionally, the skirt 92 includes a lower pocket and ballast/tension member (not shown), substantially identical to corresponding components for the previously described embodiments.

The skirt 92, however, includes an upper channel or pocket 94, unlike the skirts 48 and 48' of the previously described embodiments. The pocket 94 extends along the length of the ballast portion 96, proximate the boom's buoyant portion 96. Rather than having a tension member in the buoyant portion as in the booms for the previously described embodiments, the boom 82 includes a tension member 74" in this upper pocket 94. This tension member 74" is substantially identical to the tension members 74 and 74' of the previously described embodiments.

In other aspects, the boom 82 is substantially identical to the booms 30 and 76 for the previously described embodiments. To avoid redundancy, a description of these components is accordingly not repeated. For this reason also, FIG. 9 illustrates primarily only the buoyant portion 96 for the boom 82, and the upper part of the ballast portion 86.

Figure 11:
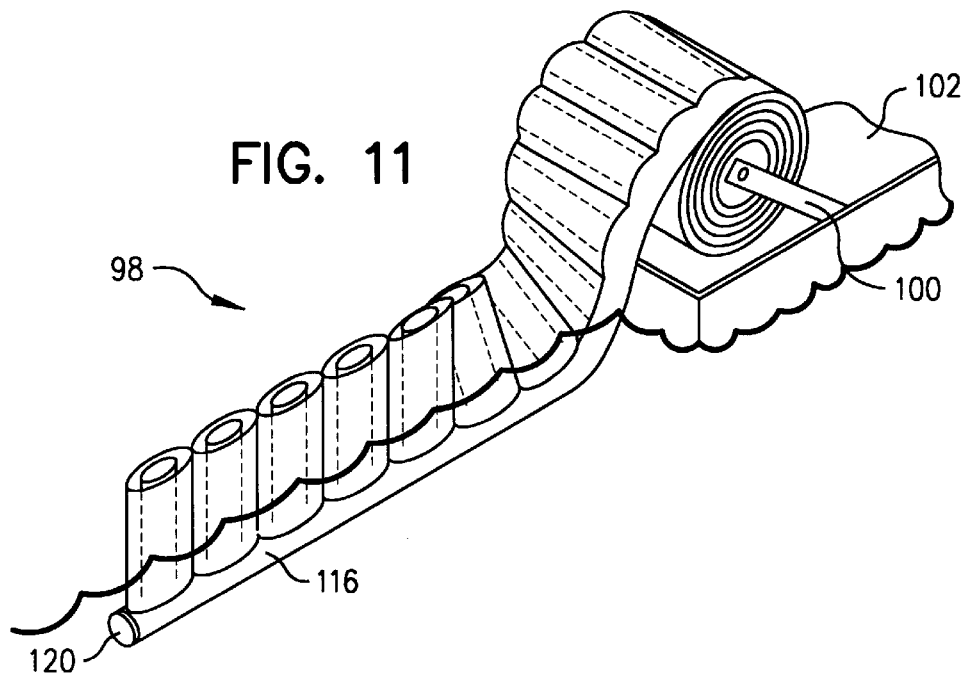
FIG. 11 illustrates a perspective view of another preferred embodiment of a boom in accordance with the present invention, shown being deployed from a reel or winch.

FIG. 11 illustrates another preferred embodiment of a boom 98 in accordance with the present invention. FIG. 11 illustrates the boom 98 deploying from a spool or reel 100, mounted to a vessel 102. (FIG. 11 illustrates only a small portion of the vessel).

Figure 12:
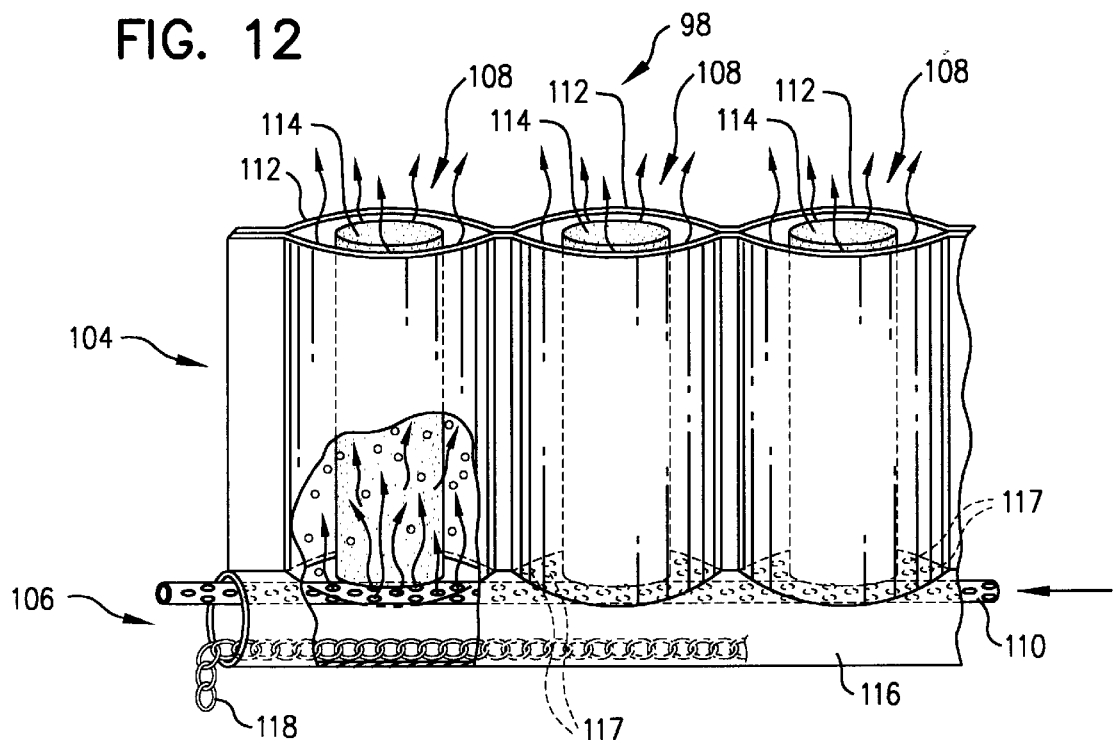
FIG. 12 illustrates a side view of part of the boom of FIG. 11, with sections of the side shown removed, illustrating partial cross-sectional views.

Referring to FIG. 12, the boom 98 includes a buoyant portion 104, and a weighted or ballast portion 106. The principal components of the buoyant portion 104 include: (i) a series of compartments 108, and (ii) at least one fluid conduit 110 for actively supplying (feeding) water along the boom for heat protection.

Each compartment 108 forms a hollow tube 112. Viewed endwise, the tubes 112 form a shape corresponding generally to that of an American football, or a human eye. The tubes 112 connect to one another in side-by-side arrangement. In particular, the tubes 112 connect to one another, along the narrower side of each tube.

In operation, the boom 98 floats on the surface of a body of water, with the tubes 112 oriented generally vertically. Specifically, one end of each tube 112 connects to the ballast portion 106, below the water's surface. The other end of the tube 112 extends more-or-less vertically upward, above the water's surface. The upper end of each tube 112 is open to the environment.

Each compartment 108 includes a flotation section formed of a foam core 114. These cores 114 are preferably made from a conventional polypropylene foam of small porosity (i.e., a micro-foam), and have an average density substantially less than that of water for providing flotation.

Each core 114 mounts substantially coaxially within a tube 112, to the tube's lower end. The cores 114 generally correspond in shape to the tubes 112, but have minor and major axes of smaller dimensions. When mounted in a tube 112, a gap thus separates the periphery of each core 114 from the inner periphery of each tube.

A tube or channel 116 runs along the bottom of the compartments 108. That is, the channel 116 runs for substantially the length of the boom 98, underneath the compartments 108. The channel 116 has a generally circular cross-section, and forms part of both of the buoyant portion 104, and the ballast portion 106.

The tube 112 of each compartment 108, mounts to the upper wall of the channel 116. Likewise, the foam core 114 in each tube 112, also mounts to the upper wall of the channel 116. When the boom 98 deploys, the compartments 108 are thus positioned more-or-less directly above the channel 116.

The fluid conduit 110 extends through the channel 116, for substantially the boom's length. The fluid conduit 110 includes an end (not shown) adapted for connection to an external source of pressurized water, preferably water. The conduit 110 introduces the fluid into the channel 116, through apertures along the length of the conduit.

Apertures 117 in the upper wall of the channel 116, connect the channel and compartments 108 in fluid communication. Fluid from the channel 116 thus enters the compartments 108 through these apertures 117. In particular, the fluid accumulates in the compartments 108, and at least partially surrounds the foam cores 112, for heat protection.

The ballast portion 106 for the boom 98 includes a chain 118 also extending through the channel 116. The chain 118 is a conventional metal type, having an average density substantially greater than that of water. The chain 118 functions to weight or ballast the boom 98, and/or for strength for resisting tension applied along the boom's length.

Referring to FIG. 11, the end of the channel 116 includes a cap 120. In alternative embodiments, provisions can be made for connecting this end of the boom 98 to another boom, or vessel, for facilitation of drawing the boom(s) into a configuration for capturing spilled pollutants, and/or applying lengthwise tension along the structure.

The material forming the tubes 112 for the flotation chambers 108, and/or channel 116 is preferably a conventional, lightweight material having resistance to elevated temperatures. Materials of this type may include fiberglass materials, coated with silica, alumuina and/or other ceramic compounds that increase resistance to elevated temperatures. Conventional materials of this type, are sold under the trade names of NEXTEL 440, manufactured by the 3-M Company of Minneapolis, Minn., or KAO-TEX 2500.

Figure 13:
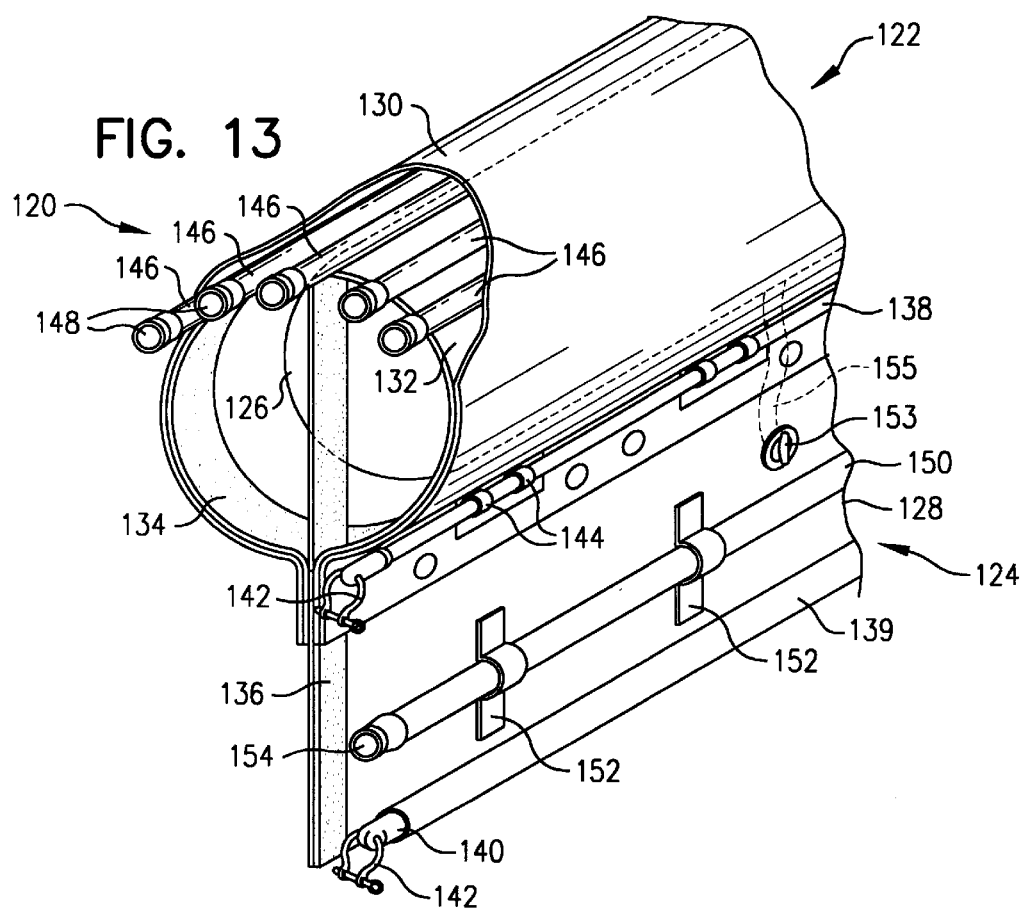
FIG. 13 illustrates a perspective view of an end portion of another preferred embodiment of a boom in accordance with the present invention.

FIG. 13 illustrates a perspective view of a portion of another preferred embodiment of a boom 120 in accordance with the present invention. The boom 120 includes features as in the boom of the first described embodiment. In particular, the boom 120 includes an active cooling system for heat protection.

As with the first described embodiment, the boom 120 includes shorter boom sections that connect in an end-to-end arrangement to form the boom. If one section becomes damaged, that section can thus be replaced without requiring replacement of the entire boom 120. The boom 120, however, has modifications, relative to the first described embodiment, for connecting one boom section to another. FIG. 13 illustrates an end portion of a boom section for the boom 120.

The boom 120 has a buoyant portion 122, and a skirt or ballast portion 124 as in the first described embodiment. Namely, the buoyant portion 122 includes a series of flotation sections 126 for providing flotation. Each flotation section 126 is formed from an air-filled bladder or chamber. The air chambers are formed in the same manner and from the same material as for the first described embodiment. That is, from a folded-over sheet of material extending for substantially the length of the boom section. The layers of the material are heat-sealed together at selected locations to define each flotation section chamber.

This fabric additionally extends downward to form a skirt 128 below the buoyant portion 122. The skirt 128 provides support for the ballast portion 124.

The buoyant portion 122 also includes cooling layers 130 and 132 as in the first described embodiment. The cooling layers 130 and 132 are formed in substantially the same manner and from the same material as for the first described embodiment. In particular, each cooling layer is formed from a sheet of hydrophilic, water absorbing, heat resistant material. The cooling layers 130 and 132 fasten around the sheet forming the flotation sections 126 in an arrangement similar to a French cuff, below the buoyant portion 122.

In the first described embodiment, the fabric forming the flotation sections and cooling layers, folded over and fastened to a plate at each end of a boom section. The present embodiment under discussion does not include such plates. Instead, the cooling layers 130 and 132 form a hollow, substantially cylindrical projection extending from the buoyant portion 122 of the end of the boom section. At one end of a boom section, the recess is designed to be a female fitting, and accepts the cylindrical projection of another boom section in a sliding fit. Conversely, the opposite end of the boom section forms a male fitting, for penetration into the female cylindrical recess of another boom section. The buoyant portions 122 of boom sections thus connect together in an arrangement similar to piping.

Conventional hook and loop type fasteners 134 of the type commonly sold under the trade name VELCRO, help to maintain the interfitting cylindrical projections connected to one another. More particularly, hook and/or loop type fasteners are disposed around the inner periphery of each female cylindrical projection, and around the outer periphery of each male cylindrical projection. The hook and loop fasteners are preferably formed of a conventional heat-resistant material, such as NOMEX, and may be formed integral with the material of the cooling layers 130 and 132.

The edges of the folded-over sheet of material forming the flotation sections 126 and skirt 128 for the boom 120, are heat sealed together at the ends of each boom section. The heat-sealed edges further include a strip of conventional VELCRO hook and loop type fasteners 136. The VELCRO fastening strip 136 extends from the top, to the bottom, of the boom 120, and is preferably formed of a conventional heat-resistant material, such as NOMEX.

The VELCRO at the end of the boom sections, helps to maintain the end of one boom section connected to another. Boom section ends having a male cylindrical projection include VELCRO loop fasteners, and the opposite female end includes VELCRO hook fasteners, or vice versa. Alternatively, each end may include a combination arrangement of both VELCRO hook and loop fasteners.

The boom 120 additionally includes upper and lower tension members 138 and 140 that aid in connecting one boom section to another. The tension members 138 and 140 are substantially identical to tension members for the first described embodiments, with one primary exception. Namely, the tension members 138 and 140 for the boom 120, include at each end a conventional clevis or other type connector 142. This connector 142 fastens the end of one tension member 138 or 140, to the end of a corresponding tension member, on an adjacent boom section.

The lower tension member 140 is a conventional metal chain, which also serves as a ballast. The lower tension member 140 slidably extends through a channel or pocket 139 along the bottom edge of the skirt 128 for the boom 120. The upper tension member 138 is a cord or rope formed from KEVLAR fibers. The upper tension member slidably extends through loops 144 along the lower side the boom's buoyant portion 122.

The boom 120 includes fluid conduits substantially identical to corresponding fluid conduits in the first described embodiment, with one principal exception. Namely, the conduits include conventional quick-disconnect ends for connecting a fluid conduit to a corresponding conduit in another boom section. At one end, a conduit terminates in a female-type quick disconnect end, and at the other end, the conduit terminates in a male-type quick-disconnect end. The quick-disconnect ends are preferably of the type that substantially seal the end of the conduit, when disconnected.

In that regard, the boom 120 includes fluid conduits 146 extending between the cooling layers 130 and 132, as in first described embodiment. The conduits 146 do not terminate at a junction box as in the first described embodiment, but rather in conventional quick-disconnect ends 148 at each end of a boom section as described above. Specifically, the ends 148 of the conduits 146 project beyond the edges of the cooling layers 130 and 132 at each boom section end, for connection to corresponding conduits in another boom section.

As described above, a quick-disconnect end 148 preferably substantially seals the end of its respective conduit, when disconnected. This is especially advantageous for conduit ends 148 that are not adjacent to another boom section, such as for ends nearest a boom towing vessel. Alternatively, such conduits ends 148 may be substantially sealed with a conventional plug or other device.

The boom 120 includes a feed conduit 150 as in the first described embodiment. The feed conduit 150 extends along the skirt 128, above the lower tension member 140. In particular, the feed conduit 150 extends through straps 152 along the skirt 128, for maintaining the feed conduit against the skirt. At each end of a boom section, the feed conduit 150 terminates in a conventional quick-disconnect 154. The quick-disconnect 154 functions to removably connect a feed conduit 150 of one boom section, to the feed conduit of an adjacent boom section. The quick-disconnect 150 additionally functions for removably connecting the end of a boom section nearest a towing vessel, to a source of pressurized water available from the vessel.

In another modification relative to the first described embodiment, the boom 120 includes a conventional air valve 153 for each flotation section 126. Each air valve 153 mounts to the skirt 128 for a boom section, below the flotation section 126 corresponding to that valve. An air channel 155 leads from each valve 153 to the flotation section 126 corresponding to that valve. The air channels 155 are formed by selectively heat sealing areas of fabric in the folded-over material forming the flotation sections 126 and skirt 128. The provision of a valve 153 for each flotation section 126 may require more time to inflate all of the flotation sections, but provides greater control for deflating flotation sections when stowing the boom 120. For instance, the boom 120 may be stowed on a reel when not deployed, and the use of a valve for each flotation section provides better control in ensuring that a flotation section 126 has been deflated, before that portion of the boom is wound onto the reel.

Figure 14:
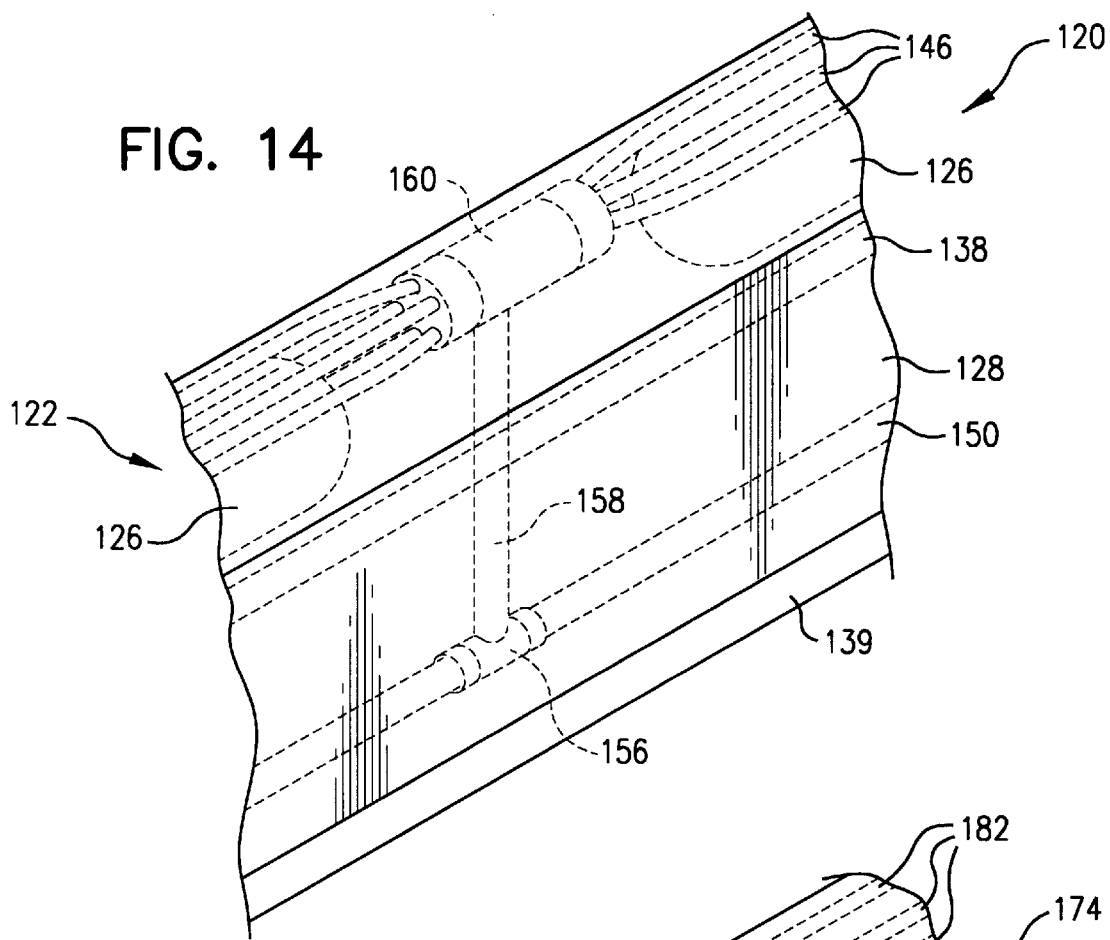
FIG. 14 illustrates a side view of the mid-portion of a boom section for the apex of the boom of FIG. 13.

Referring to FIG. 14, the boom 120 includes a special boom section for supplying water from the feed conduit 150 to the fluid conduits 146 in the buoyant portion 122. As discussed previously, heat protection is generally the most critical at the boom's apex. The special boom section should therefore be located at the apex of the boom 120 to maximize water pressure in the conduits 146 in the cooling layers 130 and 132 in this area.

The boom section shown in FIG. 14 includes a tee 156 that divides the feed conduit 150 into two halves. At approximately the central portion of the boom section, each half of the feed conduit 150 connects to an end of the tee 156. A riser 158 extends upward from the remaining end of the tee 156, through the skirt 128, to the buoyant portion 122 of the boom 120. The riser 158 enters into the buoyant portion 122, in the space between two flotation sections 126. In this space, the riser 158 connects to one end of a second tee 160.

The remaining ends of the second tee 160 connect to each of the fluid conduits 146 disposed within the buoyant portion 122. More particularly, the second tee 160 divides each of the fluid conduits 146 into two halves. Each half of a fluid conduit 146 connects to a corresponding port on an end of the second tee 160. In this way, the feed conduit 150 supplies pressurized water to the fluid conduits 146 in the buoyant portion 122 for the special boom section.

The tees 156 and 160 are preferably made of conventional materials that are resistant to elevated temperatures. The second or upper tee 160 may include perforations along its body for ensuring an adequate supply of cooling water to the cooling layers in the area around the tee.

For towing the boom 120, the boom section tension members 138 and 140 would connect to lines from a boom towing vessel. Alternatively, the boom 120 could include special boom towing sections. Such towing sections, would have a connector plate as in the first described embodiment, but without supporting a junction box 51. The fabric layers in the boom section would fold over and fasten to this connector plate, and a towing harness from a vessel would attach to the plate. The other end of the boom section, would be as described in the preceding paragraphs.

Figure 15:
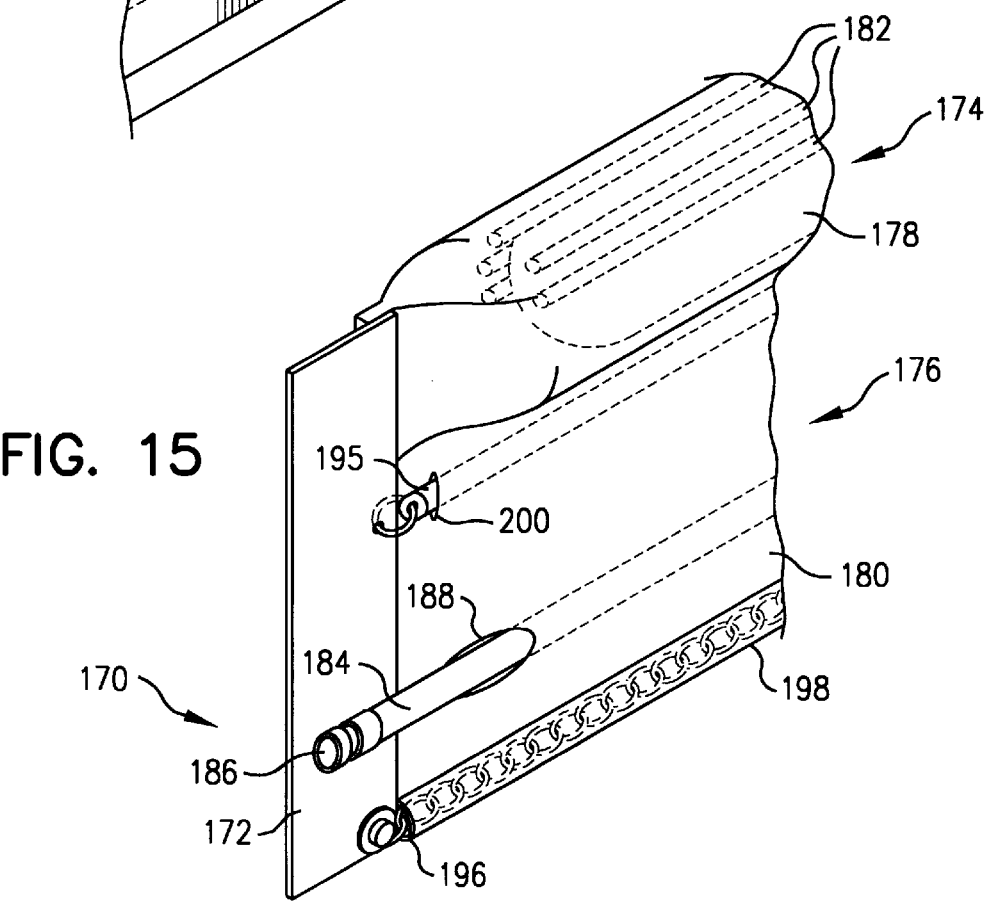
FIG. 15 illustrates a perspective view of an end portion of another preferred embodiment of a boom in accordance with the present invention.

FIG. 15 illustrates a perspective view of a portion of another preferred embodiment of a boom 170 in accordance with the present invention. The boom 170 includes features as in the first described embodiment, such as an active cooling system for heat protection. The boom 170 also includes shorter boom sections that connect in an end-to-end arrangement to form the boom as in the first described embodiment. If one section becomes damaged, that section can thus be replaced without requiring replacement of the entire boom 170.

FIG. 15 illustrates an end portion of a boom section for the boom 170. Each boom section terminates in a connector plate 172. The connector plate 172 is substantially identical to the connector plate 62 in the first described embodiment (i.e., the plate includes a channel that slidably interlocks with the connector plate on an adjacent boom section for connecting one boom section to another). The connector plates 172 for the boom 170, however, do not support junction boxes 51 as in the first described embodiment.

As with the first described embodiment, the boom 170 includes a buoyant portion 174 and a skirt or ballast portion 176. The buoyant portion 174 includes a series of flotation sections 178 for providing flotation. Each flotation section 178 is formed from an air-filled bladder or chamber in substantially the same manner and from the same material as for the first described embodiment.

The material forming the flotation sections 178 additionally extends downward to form a skirt 180 below the buoyant portion 178, as in the first described embodiment. The skirt 180 provides support for the ballast portion 176.

The buoyant portion 174 also includes cooling layers as in the first described embodiment (not shown). The cooling layers are formed in substantially the same manner and from the same material as the first described embodiment. Namely, from two sheets of hydrophilic, water absorbing, heat resistant material. The material forming the flotation sections 178 and cooling layers, folds over and fastens to the connector plate 172 at each end of a boom section.

The boom 170 additionally includes fluid conduits 182 extending along each boom section, between the cooling layers. The fluid conduits 182 are substantially identical to corresponding fluid conduits in the first described embodiment, with one principal exception. Specifically, the fluid conduits 182 do not terminate at a junction box at each end of a boom section. At the end of a boom section, each fluid conduit 182 "dead-ends" and terminates in a cap or plug.

For supplying the fluid conduits 182 with a pressurized source of water, the boom 170 includes a feed conduit 184 as in the first described embodiment, with one primary exception. At each end of a boom section, the feed conduit 184 terminates in a conventional quick-disconnect 186. The quick-disconnect 186 functions to removably connect a feed conduit 184 of one boom section, to the feed conduit of an adjacent boom section. The quick-disconnect 186 additionally functions for removably connecting the end of a boom section nearest a towing vessel, to an external source of pressurized water.

The skirt 180 for each boom section, defines a pocket or channel 188 in which the feed conduit 184 is disposed. At each end of a boom section, the feed conduit 184 projects from the channel 188, for connection to another feed conduit or to an external source of pressurized water.

Figure 16:
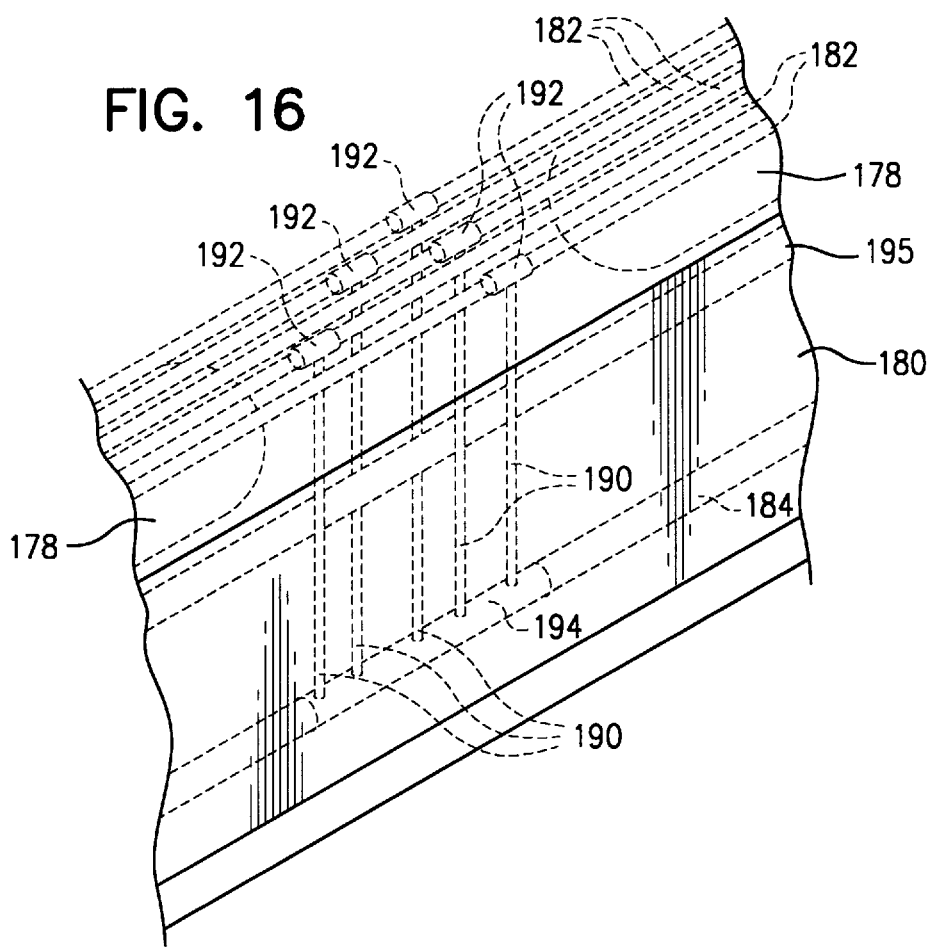
FIG. 16 illustrates a side view of the mid-portion of a section of the boom of FIG. 15.

Referring to FIG. 16, each boom section includes risers 190, located at around the mid-point of the boom section, connected to the feed conduit 184. The risers 190 supply water from the feed conduit 184 to the fluid conduits 182 in the cooling layers.

In particular, the base of each riser 190 connects in fluid communication to the feed conduit 184. More particularly, the feed conduit 184 includes at approximately its midpoint, a coupler section 194, from which the risers 190 extend. The top of each riser 190 extends upward through the skirt 180 into the boom's buoyant portion 174. In a space between two flotation sections 178, the risers 190 each form a tee 192.

The tee 192 for each riser 190, divides each fluid conduit 182 in the buoyant portion 174 into two halves. One half of a fluid conduit 182 connects to one end of a tee 192, and the other half connects to the opposite end of the tee. In this way, each fluid conduit 182 in the buoyant section 174 connects in fluid communication to the feed conduit 184.

There is an engineering tradeoff in the foregoing arrangement in that water pressure will not necessarily be greatest in the cooling layer conduits 182 at the apex of the boom 170, where heat protection is usually the most critical. Notwithstanding, it results in less complexity and avoids the necessity for a special apex boom section, and should provide sufficient water around the boom for heat protection.

There is another engineering tradeoff in that the multiple risers 190 and tees 192 in FIG. 16, arguably add complexity, relative to a single riser/tee arrangement such as an arrangement similar to that shown in FIG. 14. In this regard, the multiple riser/tee arrangement facilitates routing of the risers 190 through the skirt 180 because the risers have smaller diameters. The arrangement should additionally result in a more flexible structure.

Referring to FIG. 15, each boom section includes upper and lower tension members 195 and 196 as in the first described embodiment. The lower tension member 196 is a conventional chain, disposed in pocket or channel 198 defined along the lower edge of the skirt 180. The upper tension member 195 is a cord or rope formed from KEVLAR fibers, disposed in a pocket or channel 200 in the skirt 180 below the buoyant portion 174. At each end of a boom section, the tension members 195 and 196 fasten to the connector plate 172 at that end of the boom section.

In other features, the boom 170 preferably includes a conventional valve (not shown) for each flotation section, as described in the previous embodiment, for inflating and deflating its respective flotation section.

Generally, a water supply on the order if 100 gallons per minute for the described booms, should provide sufficient heat protection. In this regard, the feed conduits preferably have a diameter of about two inches, and fluid conduits in the buoyant portions of the described booms should each have a diameter of approximately ½ to ¾ inches. In embodiments having multiple riser arrangements, the risers should have a diameter of around ½ to ¾ inches also. In embodiments having single riser arrangements, and/or a jumper conduit, the risers and/or jumper conduits should have a diameter of approximately two inches.

While preferred embodiments of the invention have been illustrated and described, it will be appreciated that various changes can be made therein without departing from the spirit and scope of the invention. For instance, the last described embodiment could incorporate the arrangement for the tees shown in FIG. 14, in place of the riser arrangement of FIG. 16.

Further, the boom 120 of FIG. 13 could be composed of boom sections that all have the tee arrangement of FIG. 14, rather than just a boom section at the apex of this boom. This would result in less complexity in having only one type of boom section for this embodiment, but has the drawback of not providing the greatest water pressure at the boom's apex for conduits in the cooling layers.

In another alternative arrangement, the boom 30 of the first described embodiment could be made without boom sections 32. That is, the boom 30 could be one continuous length, which would simplify the boom by eliminating the need for multiple connector plates 62, jumper conduits 54, and other items. Damage to a small part of such a boom, however, could require replacement of the entire boom, rather than just a single section.

Moreover, booms in accordance with the present invention could be made with a single, continuous flotation sections extending along the length of a boom section, or even along the entire length of a boom. Such flotation sections would likely simplify boom production, but at the cost of decreasing boom flexibility, i.e., the ability of the boom to "ride" over passing waves.

Fluid conduits for supplying fluid to cooling layers in a boom could be fluid have small apertures for emitting fluid, rather than being made fluid permeable. Also, flotation sections could be formed using a combination of inflatable chambers and foam material.

In view of the alterations, substitutions and modifications that could be made by one of ordinary skill in the art, it is intended that the scope of letters patent granted hereon be limited only by the definitions of the appended claims.

The embodiments of the invention in which an exclusive property or privilege is claimed are defined as follows:

1. A boom for floating on the surface of a body of water, for use in collecting a substance floating on the water's surface, the boom comprising:

(a) a flotation section, having an average density substantially less than that of water for providing flotation;

(b) water distribution means, at least partially surrounding the flotation section, the water distribution means being for distributing water around the flotation section for protecting the boom from heat; and (c) pressurized water supply means for placing the water distribution means in fluid communication with a pressurized supply of water, for receipt of water by the water distribution means, for protecting the boom from heat.

2. The boom of claim 1, wherein the pressurized water supply means includes a fluid conduit extending substantially along the length of the boom for supplying the water along the length of the boom, the fluid conduit having an end adapted for connection in fluid communication to the pressurized supply of water.

3. The boom of claim 1, wherein the pressurized water supply means includes a plurality of fluid conduits extending substantially along the length of the boom.

4. The boom of claim 1, wherein the water distribution means, includes a space surrounding the flotation section, wherein the space accumulates water from the water distribution means.

5. The boom of claim 1, wherein the water distribution means includes a material substantially permeable to water for receiving and accumulating water from the pressurized water supply means for protecting the boom from heat.

6. The boom of claim 1, wherein the boom includes a plurality of flotation sections extending substantially along the length of the boom.

7. The boom of claim 1, wherein the pressurized water supply means includes a conduit extending through the flotation section of the boom.

8. A boom for floating on the surface of a body of water, for use in collecting a substance on the water's surface, and for connecting to a pressurized supply of water for protecting the boom from heat, the boom comprising:

(a) a flotation section having an average density substantially less than that of water for providing flotation; and (b) at least one fluid conduit, wherein the boom includes a length, the at least one fluid conduit extending substantially along the length of the boom, and being in fluid communication with the boom, along the boom's length, for supplying water along the length of the boom for protecting the boom from heat, the at least one fluid conduit having an end adapted for connection in fluid communication to the pressurized supply of water.

9. The boom of claim 8, further comprising a ballast having an average density substantially greater than that of water, wherein the flotation section includes opposite sides, and the at least one fluid conduit extends substantially along the length of the boom, to one side of the flotation section, and the ballast extends substantially along the length of the boom, to the other side of the flotation section.

10. The boom of claim 8, further comprising water distribution means at least partially surrounding the flotation section, for receiving and distributing water from the at least one fluid conduit for protecting the boom from heat.

11. The boom of claim 8, further comprising a cooling layer at least partially surrounding the flotation section, wherein at least a portion of the cooling layer is substantially fluid permeable for receiving and distributing water from the at least one fluid conduit for protecting the boom from heat.

12. The boom of claim 8, further comprising a plurality of flotation sections extending substantially along the length of the boom.

13. The boom of claim 8, further comprising a plurality of fluid conduits extending along the length of the boom.

14. The boom of claim 8, wherein the flotation section includes at least one bladder for receiving and containing air for providing flotation for the boom.

15. The boom of claim 8, wherein the at least one fluid conduit extends through the flotation section of the boom.

16. A boom for floating on the surface of a body of water, for use in collecting a substance on the water's surface, the boom comprising:

(a) a buoyant portion including:

(i) a flotation section having an average density substantially less than that of water, for providing flotation for the boom, the flotation section having opposite sides;

(ii) a cooling layer at least partially surrounding the flotation section, wherein at least a portion of the cooling layer is substantially fluid permeable for receiving and distributing water for protecting the boom from heat; and (iii) at least one fluid conduit, wherein the boom includes a length, the at least one fluid conduit extending substantially along the length of the boom to one side of the flotation section, the at least one fluid conduit being in fluid communication with the cooling layer for supplying the cooling layer with water; and (b) a ballast portion connected to the buoyant portion, the ballast portion extending from the buoyant portion, to the side of the flotation section opposite the at least one fluid conduit, wherein the ballast portion has an average density substantially greater than that of water.

17. The boom of claim 16, wherein the boom further includes another cooling layer, extending at least partially over the other cooling layer, with the at least one fluid conduit extending between the cooling layers.

18. The boom of claim 16, further comprising a plurality of fluid conduits extending substantially along the length of the boom.

19. The boom of claim 16, wherein the flotation section includes at least one bladder for receiving and holding air for providing flotation for the boom.

20. The boom of claim 16, wherein the boom is for connecting to a pressurized supply of water, the at least one fluid conduit including an end adapted for connection to the pressurized supply of water.

* * * * *